(12) United States Patent
Zhang et al.

(10) Patent No.: US 9,053,747 B1
(45) Date of Patent: Jun. 9, 2015

(54) DISK DRIVE CALIBRATING FAILURE THRESHOLD BASED ON NOISE POWER EFFECT ON FAILURE DETECTION METRIC

(71) Applicant: Western Digital Technologies, Inc., Irvine, CA (US)

(72) Inventors: Baoliang Zhang, Foothill Ranch, CA (US); Carl E. Barlow, Lake Forest, CA (US); Chun Sei Tsai, Tustin, CA (US)

(73) Assignee: Western Digitial Technologies, Inc., Irvine, CA (US)

( * ) Notice: Subject to any disclaimer, the term of this patent is extended or adjusted under 35 U.S.C. 154(b) by 0 days.

(21) Appl. No.: 13/752,758

(22) Filed: Jan. 29, 2013

(51) Int. Cl.
G11B 5/09 (2006.01)
G11B 20/18 (2006.01)

(52) U.S. Cl.
CPC .................................. G11B 20/182 (2013.01)

(58) Field of Classification Search
None
See application file for complete search history.

(56) References Cited

U.S. PATENT DOCUMENTS

| | | | |
|---|---|---|---|
| 5,786,951 A | 7/1998 | Welland et al. | |
| 5,914,967 A | 6/1999 | Yomtoubian | |
| 6,005,731 A * | 12/1999 | Foland et al. | 360/53 |
| 6,249,890 B1 | 6/2001 | Ukani et al. | |
| 6,359,433 B1 | 3/2002 | Gillis et al. | |
| 6,467,153 B2 * | 10/2002 | Butts et al. | 29/603.03 |
| 6,731,443 B2 | 5/2004 | Bliss et al. | |
| 6,771,442 B2 | 8/2004 | Bliss et al. | |
| 6,822,821 B2 | 11/2004 | Gan et al. | |
| 6,940,279 B2 * | 9/2005 | Chong et al. | 324/210 |
| 6,948,102 B2 | 9/2005 | Smith | |
| 6,982,842 B2 | 1/2006 | Jing et al. | |
| 7,304,816 B2 | 12/2007 | Johnson et al. | |
| 7,330,325 B2 | 2/2008 | Vacar et al. | |
| 7,369,339 B2 | 5/2008 | Kojima et al. | |
| 7,372,651 B2 | 5/2008 | Gunderson et al. | |
| 7,373,559 B2 | 5/2008 | Guha | |
| 7,487,401 B2 | 2/2009 | Urmanov et al. | |
| 7,496,796 B2 | 2/2009 | Kubo et al. | |
| 7,656,763 B1 | 2/2010 | Jin et al. | |
| 7,805,630 B2 | 9/2010 | Kerner et al. | |
| 7,990,648 B1 | 8/2011 | Wang | |
| 7,996,724 B1 | 8/2011 | Coatney et al. | |
| 8,169,726 B2 * | 5/2012 | Wilson | 360/46 |
| 8,625,216 B2 * | 1/2014 | Zhang et al. | 360/39 |
| 2002/0036850 A1 | 3/2002 | Lenny et al. | |
| 2003/0204788 A1 | 10/2003 | Smith | |
| 2004/0051988 A1 | 3/2004 | Jing et al. | |
| 2005/0246591 A1 | 11/2005 | Johnson et al. | |
| 2006/0212755 A1 | 9/2006 | Urmanov et al. | |
| 2009/0037654 A1 | 2/2009 | Allison et al. | |
| 2011/0055431 A1 | 3/2011 | Fulkerson et al. | |

FOREIGN PATENT DOCUMENTS

WO    WO 2006/036812 A2    4/2006

* cited by examiner

Primary Examiner — K. Wong

(57) ABSTRACT

A disk drive is disclosed comprising a head actuated over a disk comprising a plurality of tracks, wherein each track comprises a plurality of data sectors. A test pattern is written to at least one data sector in at least one track, and the test pattern is read from the disk to generate a noisy read signal comprising added noise. An estimated data sequence is detected from the noisy read signal, and an amplitude of the added noise is increased until a failure detection metric reaches a metric threshold. A failure threshold is generated based on the amplitude of the added noise when the failure detection metric reaches the metric threshold, and a failure condition of the disk drive is predicted based on the failure threshold.

24 Claims, 5 Drawing Sheets

DISK DRIVE CALIBRATING FAILURE THRESHOLD BASED ON NOISE POWER EFFECT ON FAILURE DETECTION METRIC

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

It is desirable to accurately predict when components in the disk drive might be degrading or failing, such as the read element, or the write element, or the laser used to heat the disk surface with heat assisted magnetic recording (HAMR). When a failure is predicted, the disk drive may take appropriate steps, such as recalibrating a bias current applied to the read element, recalibrating a write current applied to the write element, or recalibrating the laser power for HAMR. Predicting degradation or failure of the disk drive may trigger remedial measures to protect against data loss, such as performing write verify operations or increasing the frequency of data refresh. In other cases, the end user may be notified with an error message when degradation or failure of the disk drive is predicted.

DETAILED DESCRIPTION

Figure 1:
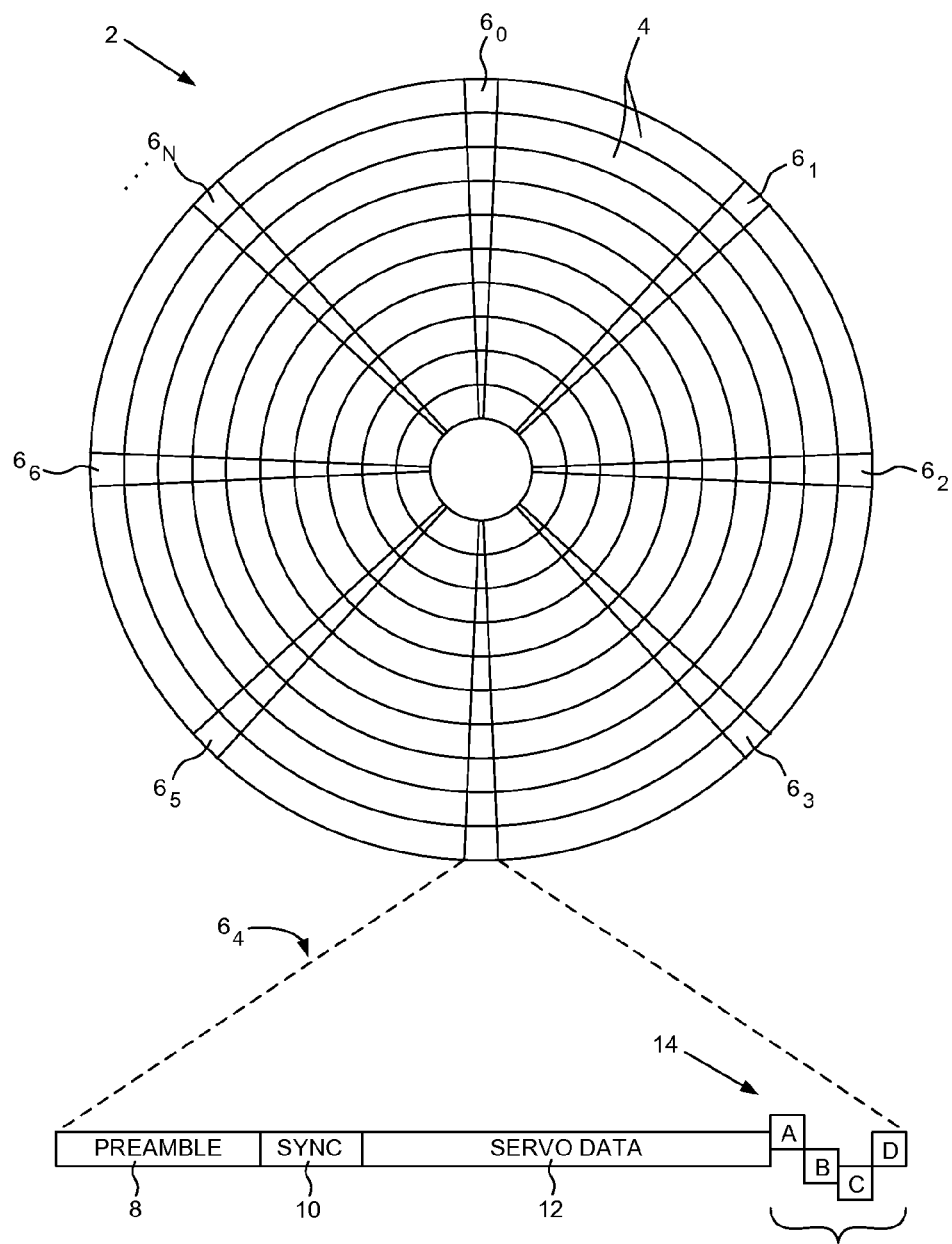
FIG. 1 shows a prior art disk format comprising a plurality of servo tracks defined by servo sectors.
Figure 2:
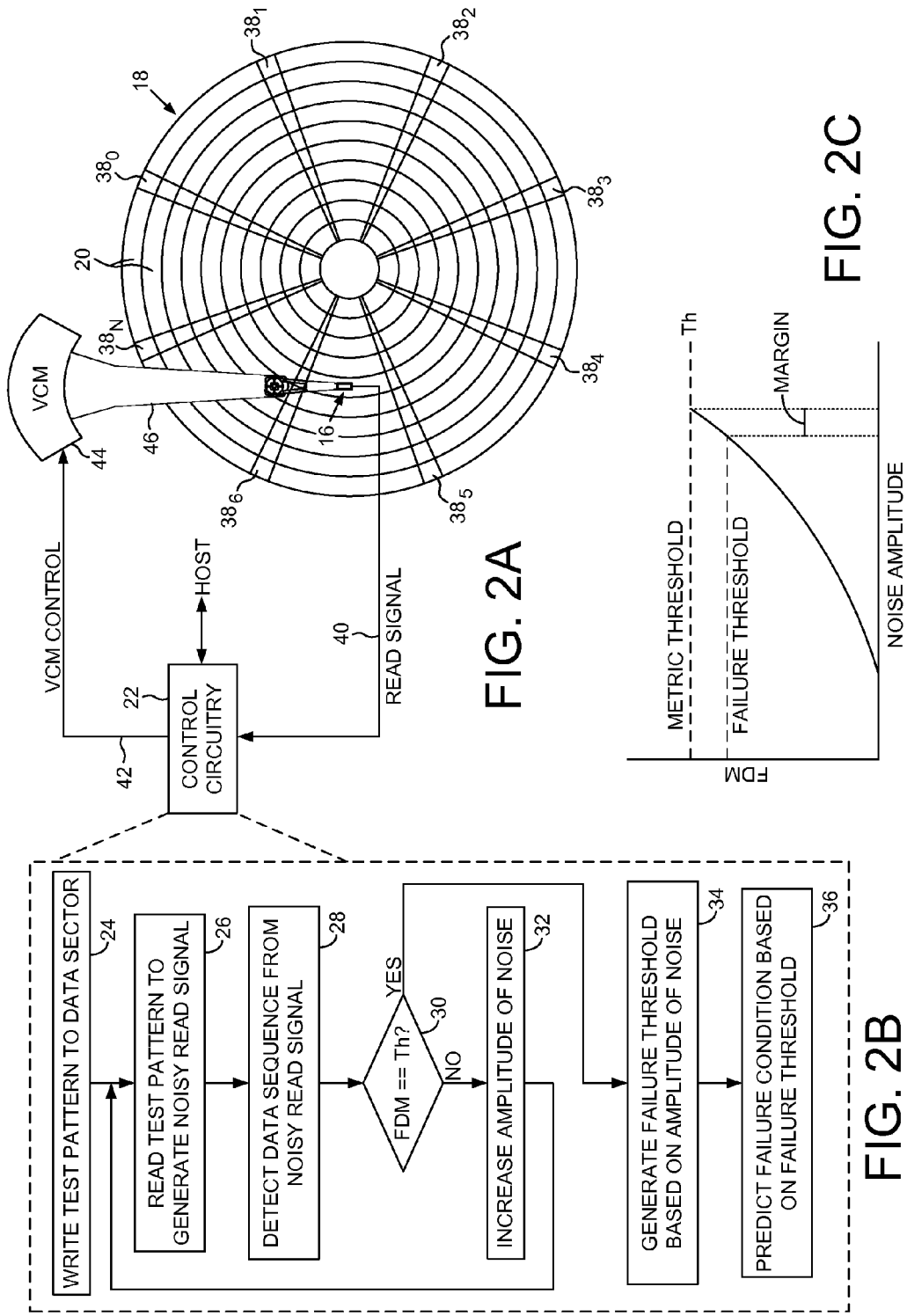
FIG. 2A shows a disk drive according to an embodiment of the present invention comprising a head actuated over a disk.
FIG. 2B is a flow diagram according to an embodiment of the present invention wherein a failure threshold is calibrated by increasing an amplitude of noise in a read signal until a failure detection metric reaches a metric threshold.
FIG. 2C illustrates an embodiment of the present invention wherein the failure threshold is selected relative to an offset (margin) from when the failure detection metric reaches the metric threshold.

FIG. 2A shows a disk drive according to an embodiment of the present invention comprising a head 16 actuated over a disk 18 comprising a plurality of tracks 20, wherein each track comprises a plurality of data sectors. The disk drive further comprises control circuitry 22 operable to execute the flow diagram of FIG. 2B, wherein a test pattern is written to at least one data sector in at least one track (block 24). The test pattern is read from the disk to generate a noisy read signal comprising added noise (block 26), and an estimated data sequence is detected from the noisy read signal (block 28). An amplitude of the added noise is increased (block 32) until a failure detection metric reaches a metric threshold (block 30). A failure threshold is generated based on the amplitude of the added noise when the failure detection metric reaches the metric threshold (block 34), and a failure condition of the disk drive is predicted based on the failure threshold (block 36).

In the embodiment of FIG. 2A, the disk 18 comprises embedded servo sectors $38_0$-$38_N$ that define a plurality of servo tracks, wherein data tracks 20 are defined relative to the servo tracks at the same or different radial density. The control circuitry 22 processes a read signal 40 emanating from the head 16 to demodulate the servo sectors $38_0$-$38_N$ and generate a position error signal (PES) representing an error between the actual position of the head and a target position relative to a target track. The control circuitry 22 filters the PES using a suitable compensation filter to generate a control signal 42 applied to a voice coil motor (VCM) 44 which rotates an actuator arm 46 about a pivot in order to actuate the head 16 radially over the disk in a direction that reduces the PES. The servo sectors $38_0$-$38_N$ may comprise any suitable position information, such as a track address for coarse positioning and servo bursts for fine positioning. The servo bursts may comprise any suitable pattern, such as the amplitude-based servo pattern, or a suitable phase-based servo pattern.

Any suitable head 16 may be employed in the disk drive, such as a head comprising an inductive write element and a magnetoresistive read element. The head 16 may also comprise a suitable actuator, such as a heater or piezoelectric actuator, for controlling a fly height of the head 16 over the disk 18. In one embodiment, the head 16 may comprise a suitable laser and optical components (e.g., a waveguide and near field transducer) used to heat the disk surface during write operations to implement heat assisted magnetic recording (HAMR). One or more of the components within the head will typically degrade over time, and in the embodiments of the present invention, a failure condition is predicted prior to an actual failure so that appropriate remedial action may be taken before experiencing a catastrophic data loss.

In embodiments of the present invention, when calibrating the failure threshold, degradation of the head over time is simulated by adding noise to the read signal that is generated from reading the test pattern from the disk. That is, a degrading head will decrease the signal-to-noise ratio of the read signal, and therefore adding noise to the read signal during a calibration procedure will simulate degradation of the head over time. Any suitable technique may be employed to add noise to the read signal during the calibration procedure, such as by decreasing the write current when writing the test pattern to the disk, decreasing the laser power (for HAMR) when writing the test pattern to the disk, increasing the fly height of the head when writing and/or reading the test pattern, adjusting a bias signal applied to the read element when reading the test pattern, inducing an off-track offset when reading the test pattern, or detuning any other suitable parameter of the write/read channel. The amplitude of the added noise in the read signal may be increased during the calibration procedure by further detuning the write/read channel parameter and rereading the test pattern. In another embodiment described below, a base read signal may be generated by reading the test pattern from the disk, and then noise injected into the base read signal in order to generate the noisy read signal. Regardless as to how the noisy read signal is generated, during the calibration procedure of FIG. 2B the amplitude of the added noise is increased at block 32 until the failure detection metric (FDM) reaches the metric threshold.

FIG. 2C illustrates an embodiment of the present invention wherein a FDM is plotted relative to the amplitude of the noise added to the read signal. In this embodiment, adding noise to the read signal causes the FDM to increase toward a metric threshold. For example, in one embodiment the FDM comprises a number of bits corrected in a data sector when reading the test pattern, wherein the number of bits corrected increases as the noise amplitude increases. When the FDM reaches the metric threshold (e.g., a threshold number of bits corrected), the failure threshold is generated by subtracting a margin from the noise amplitude and setting the failure threshold to the FDM that corresponds to the margin offset as illustrated in FIG. 2C.

In one embodiment, the metric threshold in FIG. 2C corresponds to an inability to accurately detect the test pattern from the noisy read signal. For example, in one embodiment the metric threshold corresponds to the maximum number of bit errors in a data sector that can be corrected by the read channel. Accordingly in this embodiment the metric threshold corresponds to a catastrophic failure of the disk drive, and therefore the failure threshold for predicting failure of the disk drive while in the field is set lower than the metric threshold by a predetermined margin so that a failure is predicted prior to experiencing the catastrophic failure. The failure threshold is set lower by selecting the FDM that corresponds to the noise amplitude offset by a margin from the noise amplitude that caused the FDM to reach the metric threshold.

Any suitable FDM may be measured in the embodiments of the present invention, including any suitable parameter of the read signal (e.g., amplitude of the read signal), any suitable parameter of a read channel for processing the read signal (e.g., variable gain amplifier, timing recovery, equalizer, noise filter, etc.), or any suitable parameter of a sequence detector operable to detect the estimated data sequence from the noisy read signal. In one embodiment, the sequence detector comprises an iterative sequence detector (e.g., a Turbo Code detector, or Low Density Parity Check Code detector), and the FDM and the metric threshold comprise a number of iterations needed to accurately recover the test pattern. For example, the metric threshold may correspond to a maximum number of iterations needed to accurately recover the test pattern before an unrecoverable error is declared.

Figure 3:
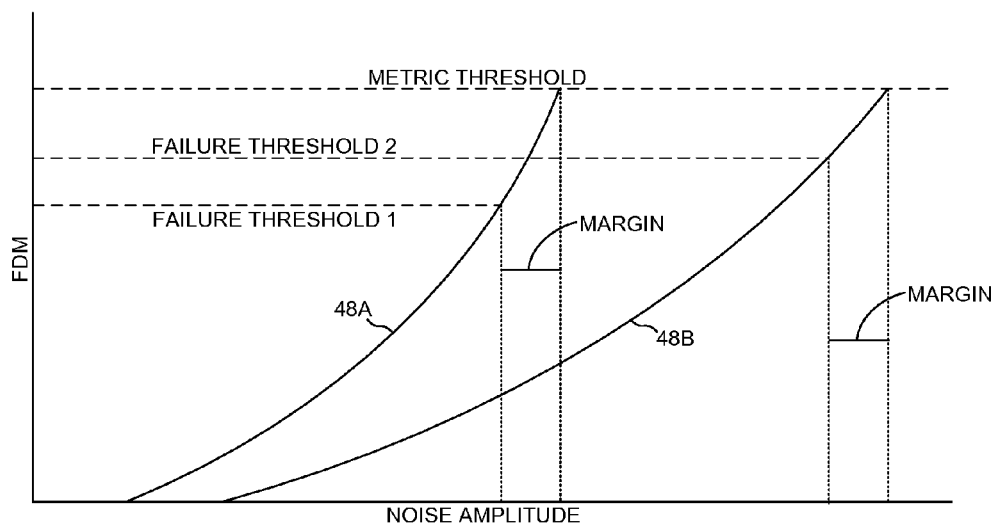
FIG. 3 illustrates an embodiment of the present invention wherein the failure threshold may be different for different heads (or different zones for the same head) due to the failure detection metric reaching the metric threshold at different noise amplitudes.

FIG. 3 shows two curves 48A and 48B representing the relationship between the FDM and noise amplitude for two different heads, or for two different zones on the disk for the same head. That is, in one embodiment a failure threshold may be calibrated for each head in a disk drive, as well as for each zone on each disk surface (where the data tracks are grouped together to form a plurality of zones). As shown in FIG. 3, the first curve 48A corresponds to a head that begins degrading sooner and faster than the head (or zone) that corresponds to the second curve 48B. Since the margin for selecting the failure threshold is the same for both curves, the failure threshold for the first curve 48A is lower than the failure threshold for the second curve 48B so that a failure condition is predicted sooner for the corresponding head (or zone).

Figure 4A:
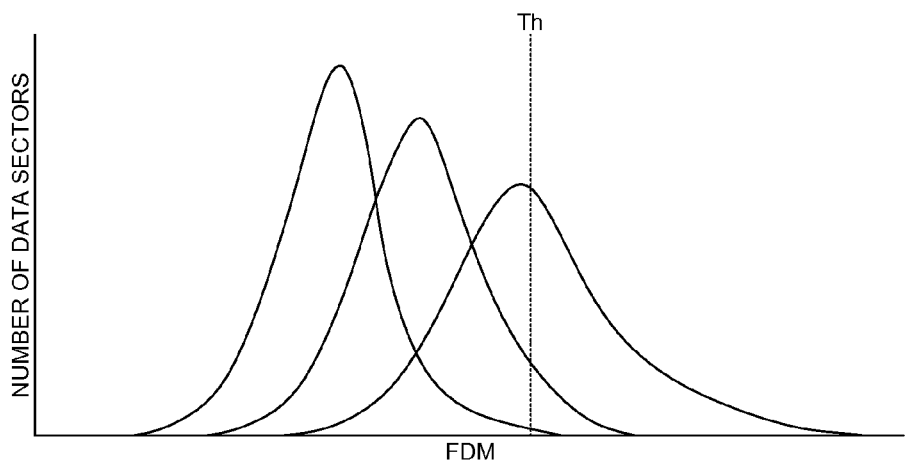
FIGS. 4A and 4B illustrate an embodiment of the present invention wherein a plurality of data sectors are evaluated in order to generate a statistical detection metric for calibrating the failure threshold.

In one embodiment, when calibrating the failure threshold the test pattern is written to a plurality of data sectors of one or more of the data tracks in order to generate a statistical sampling of the FDM for the plurality of data sectors. Evaluating a statistical sampling of the FDM in this embodiment may provide a more accurate degradation estimate for each head/zone. FIG. 4A illustrates an example of this embodiment which shows three histograms, where each histogram represents the distribution of the data sectors relative to the possible FDMs for three increasing settings of the noise amplitude. As the noise amplitude increases, the histogram shifts to the right and the standard deviation increases. FIG. 4A also shows an arbitrary threshold wherein for each histogram, the FDM for a percentage of the data sectors will exceed the threshold.

Figure 4B:
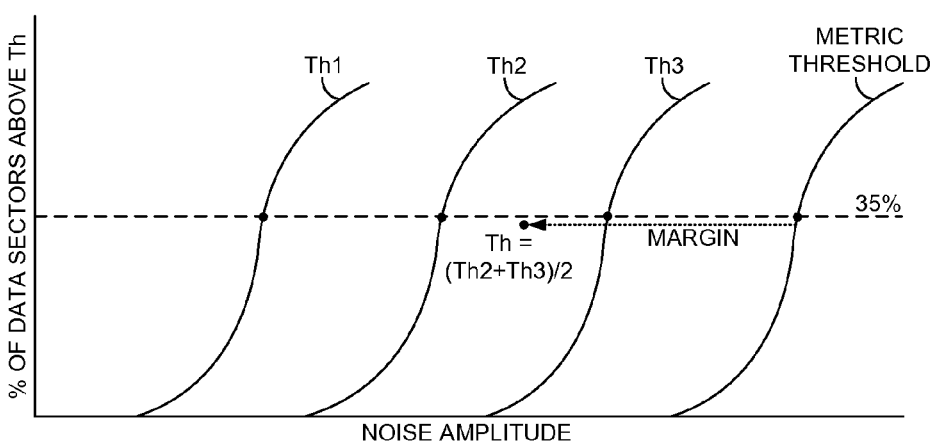

FIG. 4B shows a plurality of percentage curves each corresponding to a different threshold in FIG. 4A. The last curve in FIG. 4B corresponds to the threshold in FIG. 4A being the metric threshold of FIG. 2C, wherein in this embodiment the noise amplitude reaches a level where a predetermined percentage (e.g., 35%) of the data sectors have a FDM that reaches the metric threshold. The percentage of data sectors on the last curve represents a statistical detection metric, and the failure threshold is generated relative to when the statistical detection metric reaches a predetermined value (e.g., 35%). For example, the failure threshold is generated based on an offset (margin) from the noise amplitude that causes the statistical detection metric to reach the predetermined value as shown in FIG. 4B.

In one embodiment, in order to determine the failure threshold a number of curves are generated in FIG. 4B corresponding to a number of different thresholds in FIG. 4A. That is, the histograms of FIG. 4A are evaluated at a number of different noise amplitude settings and for a number of different thresholds to generate the curves shown in FIG. 4B. The resulting samples (at 35%) may then be processed to generate a mathematical relationship between the thresholds and the noise amplitudes (e.g., using a suitable curve fitting technique). The threshold that corresponds to the offset (margin) from the last curve in FIG. 4B is then determined using this mathematical relationship. In the example shown in FIG. 4B, the margin extends halfway between Th2 and Th3, and therefore the failure threshold is computed as the average of these two thresholds.

While the disk drive is deployed in the field, no noise is added to the read signal. Instead, the gradual increase of the FDM toward the failure threshold is caused by degradation of the head. In one embodiment, an FDM is measured for each data sector and a failure condition is predicted if the FDM reaches the failure threshold as shown in FIG. 2C. In the embodiment of FIGS. 4A and 4B, the FDM is measured for a plurality of the data sectors (e.g., within each zone), and a failure condition is detected when the above-described statistical detection metric reaches the predetermined value (e.g., 35%) relative to the failure threshold. The threshold in FIG. 4A is set to the calibrated failure threshold, and a failure condition is predicted when a percentage (e.g., 35%) of the data sectors have a FDM that exceeds the failure threshold. That is, the histogram of FIG. 4A will shift right as the head degrades over time until a percentage (e.g., 35%) of the data sectors have a FDM that exceeds the calibrated failure threshold.

Figure 5:
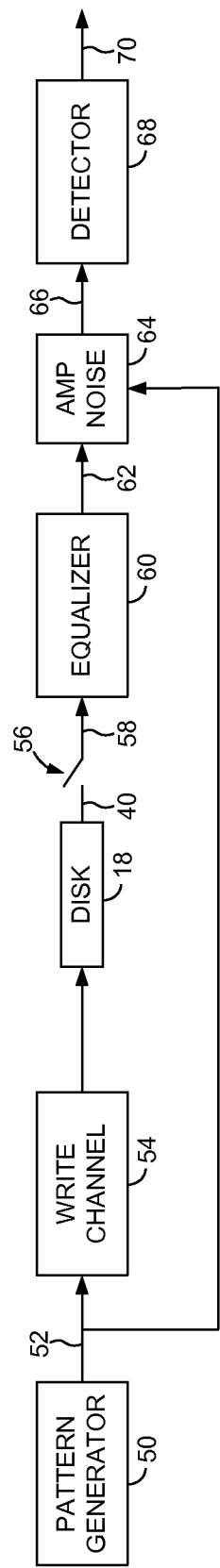
FIG. 5 illustrates an embodiment of the present invention for injecting noise into a base read signal in order to increase the noise added to the read signal when calibrating the failure threshold.

FIG. 5 shows an embodiment of the present invention for injecting noise into a base read signal generated by reading the test pattern from the disk. A pattern generator 50 generates the test pattern 52 which is written to the disk 18 through a write channel 54 (which may comprise a preamp and a write element of the head). The base read signal 40 emanating from the head 16 is sampled 56 to generate signal samples 58. An equalizer 60 equalizes the signal samples 58 according to a target response (e.g., a target partial response) to generate equalized samples 62. Block 64 amplifies the noise in the equalized samples 62 by implementing the following equation:

$$y(k)=E(k)+\gamma(E(k)-x(k))$$

where y(k) represents the noisy signal samples 66, x(k) represents the equalized samples 62, E(k) represents expected samples corresponding to the test pattern 52 and the transfer function of the write/read channel, and γ is a gain that controls the amplitude of the added noise as shown in FIG. 2C. The noisy signal samples 66 are processed by a sequence detector 68 to generate an estimated data sequence 70. In other embodiments, the noise may be injected into the base read signal by adding a noise signal to the base read signal in either the analog domain or the discrete-time domain (rather than amplify the noise in the base read signal).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks, wherein each track comprises a plurality of data sectors;
   a head; and
   control circuitry operable to:
      write a test pattern to at least one data sector in at least one track;
      read the test pattern from the disk to generate a noisy read signal comprising added noise;
      detect an estimated data sequence from the noisy read signal;
      increase an amplitude of the added noise until a failure detection metric reaches a metric threshold;
      generate a failure threshold based on the amplitude of the added noise when the failure detection metric reaches the metric threshold; and
      predict a failure condition of the disk drive based on the failure threshold.

2. The disk drive as recited in claim 1, wherein the control circuitry is operable to increase the amplitude of the added noise by injecting noise into a base read signal generated from reading the test pattern.

3. The disk drive as recited in claim 1, wherein the control circuitry is operable to increase the amplitude of the added noise by increasing a fly height of the head while reading the test pattern.

4. The disk drive as recited in claim 1, wherein the control circuitry is operable to increase the amplitude of the added noise by inducing an off-track offset while reading the test pattern.

5. The disk drive as recited in claim 1, wherein the metric threshold corresponds to an inability to accurately detect the test pattern from the noisy read signal.

6. The disk drive as recited in claim 1, wherein the metric threshold comprises a threshold number of bits corrected in the data sector.

7. The disk drive as recited in claim 1, wherein:
   the control circuitry is operable to detect the estimated data sequence using an iterative sequence detector; and
   the metric threshold comprises a number of iterations needed to accurately recover the test pattern.

8. The disk drive as recited in claim 1, wherein the control circuitry is further operable to generate the failure threshold based on an offset from the amplitude of the added noise that causes the failure detection metric to reach the metric threshold.

9. The disk drive as recited in claim 1, wherein the control circuitry is further operable to:
   write a test pattern to a plurality of the data sectors;
   read the test pattern from the plurality of the data sectors to generate the noisy read signal;
   measure the failure detection metric for each data sector for each amplitude of the noise;
   generate a statistical detection metric based on the failure detection metrics measured for the plurality of data sectors; and
   generate the failure threshold based on the amplitude of the noise when the statistical detection metric reaches a predetermined value.

10. The disk drive as recited in claim 9, wherein the statistical detection metric corresponds to a percentage of the data sectors having the failure detection metric reach the metric threshold.

11. The disk drive as recited in claim 10, wherein the control circuitry is further operable to generate the failure threshold based on an offset from the amplitude of the added noise that that causes the statistical detection metric to reach the predetermined value.

12. The disk drive as recited in claim 1, wherein the control circuitry is further operable to predict the failure condition of the disk drive when the failure detection metric exceeds the failure threshold and the amplitude of the added noise is substantially zero.

13. A method of operating a disk drive comprising a head actuated over a disk comprising a plurality of tracks, wherein each track comprises a plurality of data sectors, the method comprising:
- writing a test pattern to at least one data sector in at least one track;
- reading the test pattern from the disk to generate a noisy read signal comprising added noise;
- detecting an estimated data sequence from the noisy read signal;
- increasing an amplitude of the added noise until a failure detection metric reaches a metric threshold;
- generating a failure threshold based on the amplitude of the added noise when the failure detection metric reaches the metric threshold; and
- predicting a failure condition of the disk drive based on the failure threshold.

14. The method recited in claim 13, wherein increasing the amplitude of the added noise comprises injecting noise into a base read signal generated from reading the test pattern.

15. The method as recited in claim 13, wherein increasing the amplitude of the added noise comprises increasing a fly height of the head while reading the test pattern.

16. The method as recited in claim 13, wherein increasing the amplitude of the added noise comprises inducing an off-track offset while reading the test pattern.

17. The method as recited in claim 13, wherein the metric threshold corresponds to an inability to accurately detect the test pattern from the noisy read signal.

18. The method as recited in claim 13, wherein the metric threshold comprises a threshold number of bits corrected in the data sector.

19. The method as recited in claim 13, wherein:
- the method further comprises detecting the estimated data sequence using an iterative sequence detector; and
- the metric threshold comprises a number of iterations needed to accurately recover the test pattern.

20. The method as recited in claim 13, further comprising generating the failure threshold based on an offset from the amplitude of the added noise that causes the failure detection metric to reach the metric threshold.

21. The method as recited in claim 13, further comprising:
- writing a test pattern to a plurality of the data sectors;
- reading the test pattern from the plurality of the data sectors to generate the noisy read signal;
- measuring the failure detection metric for each data sector for each amplitude of the noise;
- generating a statistical detection metric based on the failure detection metrics measured for the plurality of data sectors; and
- generating the failure threshold based on the amplitude of the noise when the statistical detection metric reaches a predetermined value.

22. The method as recited in claim 21, wherein the statistical detection metric corresponds to a percentage of the data sectors having the failure detection metric reach the metric threshold.

23. The method as recited in claim 22, further comprising generating the failure threshold based on an offset from the amplitude of the added noise that that causes the statistical detection metric to reach the predetermined value.

24. The method as recited in claim 13, further comprising predicting the failure condition of the disk drive when the failure detection metric exceeds the failure threshold and the amplitude of the added noise is substantially zero.

* * * * *